US009623386B2

(12) United States Patent
Tsuchimoto

(10) Patent No.: US 9,623,386 B2
(45) Date of Patent: Apr. 18, 2017

(54) MIXING APPARATUS FOR POWDER RAW MATERIAL AND LIQUID RAW MATERIAL AND METHOD FOR MANUFACTURING MIXTURE USING SAME

(71) Applicant: Tohkai-Giken Co., Ltd., Kanagawa (JP)

(72) Inventor: Yoshihiro Tsuchimoto, Kanagawa (JP)

(73) Assignee: Tohkai-Giken Co., Ltd., Kanagawa (JP)

( * ) Notice: Subject to any disclaimer, the term of this patent is extended or adjusted under 35 U.S.C. 154(b) by 127 days.

(21) Appl. No.: 14/439,710

(22) PCT Filed: Jun. 21, 2013

(86) PCT No.: PCT/JP2013/067058
§ 371 (c)(1),
(2) Date: Apr. 30, 2015

(87) PCT Pub. No.: WO2014/203390
PCT Pub. Date: Dec. 24, 2014

(65) Prior Publication Data
US 2015/0290601 A1    Oct. 15, 2015

(51) Int. Cl.
*B01F 5/22*    (2006.01)
*B01F 3/12*    (2006.01)
(Continued)

(52) U.S. Cl.
CPC .............. *B01F 5/221* (2013.01); *A21C 1/02* (2013.01); *B01F 3/1221* (2013.01); *B01F 7/00758* (2013.01); *B01J 2/14* (2013.01)

(58) Field of Classification Search
CPC ........ B01F 5/22; B01F 5/221; B01F 7/00758; B01F 5/223; B01F 3/1221; B01J 2/14
(Continued)

(56) References Cited

U.S. PATENT DOCUMENTS 2,853,280 A * 9/1958 Cusi ................. B01F 7/162
261/93
3,017,854 A * 1/1962 O'Brien ................. B01F 5/228
118/19
(Continued)

FOREIGN PATENT DOCUMENTS

JP          55119430        9/1980
JP       2002191953 A       7/2002
(Continued)

OTHER PUBLICATIONS

"International Application Serial No. PCT/JP2013/067058, International Search Report mailed Sep. 10, 2013", 2 pgs.

*Primary Examiner* — Tony G Soohoo
(74) *Attorney, Agent, or Firm* — Schwegman Lundberg & Woessner, P.A.

(57) ABSTRACT

A mixing apparatus is provided that evenly mixes a powder raw material and a liquid raw material. The powder raw material is supplied to and spread out on a rotating disk to form a thin layer of dispersed particle swarms close to the periphery of the rotating disk. A rotary atomizer that synchronously rotates on the same axis is provided above the rotating disk. The liquid raw material is supplied to an inside surface of the rotary atomizer. Then, the liquid raw material is conducted to an atomizing head where the liquid raw material is atomized, and droplet swarms are horizontally radiated. The dispersed particle swarms and the droplet swarms are merged and condensed within a tapered wedge-shaped space, with the result that these swarms change into a fine and homogeneous mixture. The mixture is then radiated from the periphery.

4 Claims, 15 Drawing Sheets

(51) Int. Cl.
*B01F 7/00* (2006.01)
*B01J 2/14* (2006.01)
*A21C 1/02* (2006.01)

(58) Field of Classification Search
USPC .............................................. 366/165.3, 263
See application file for complete search history.

(56) References Cited

U.S. PATENT DOCUMENTS

| | | | | |
|---|---|---|---|---|
| 3,400,915 A | * | 9/1968 | Onishi | B01F 5/223 366/290 |
| 3,998,433 A | * | 12/1976 | Iwako | B01F 7/00758 366/178.3 |
| 4,175,873 A | * | 11/1979 | Iwako | B01F 5/26 366/165.3 |
| 4,690,834 A | * | 9/1987 | Appelgren | B01F 5/167 118/19 |
| 5,279,463 A | * | 1/1994 | Holl | B01F 3/1221 241/1 |
| 5,762,709 A | * | 6/1998 | Sugimoto | H01L 21/6715 118/319 |
| 6,159,541 A | * | 12/2000 | Sakai | B05C 11/08 118/320 |
| 8,225,737 B2 | * | 7/2012 | Kitano | G03F 7/162 118/319 |
| 2004/0032792 A1 | * | 2/2004 | Enomura | B01F 7/00758 366/263 |
| 2009/0169456 A1 | * | 7/2009 | Yang | B01F 3/1221 423/338 |
| 2010/0110824 A1 | | 5/2010 | Hirata et al. | |
| 2013/0019972 A1 | * | 1/2013 | Odagi | B01F 3/0807 137/572 |
| 2014/0010038 A1 | * | 1/2014 | Iwako | B01F 3/1221 366/91 |
| 2015/0290601 A1 | * | 10/2015 | Tsuchimoto | A21C 1/02 366/165.2 |

FOREIGN PATENT DOCUMENTS

| | | |
|---|---|---|
| JP | 2008006442 A | 1/2008 |
| WO | WO-2008015756 A1 | 2/2008 |
| WO | WO-2008143056 A1 | 11/2008 |
| WO | WO-2014003390 A1 | 12/2014 |

* cited by examiner

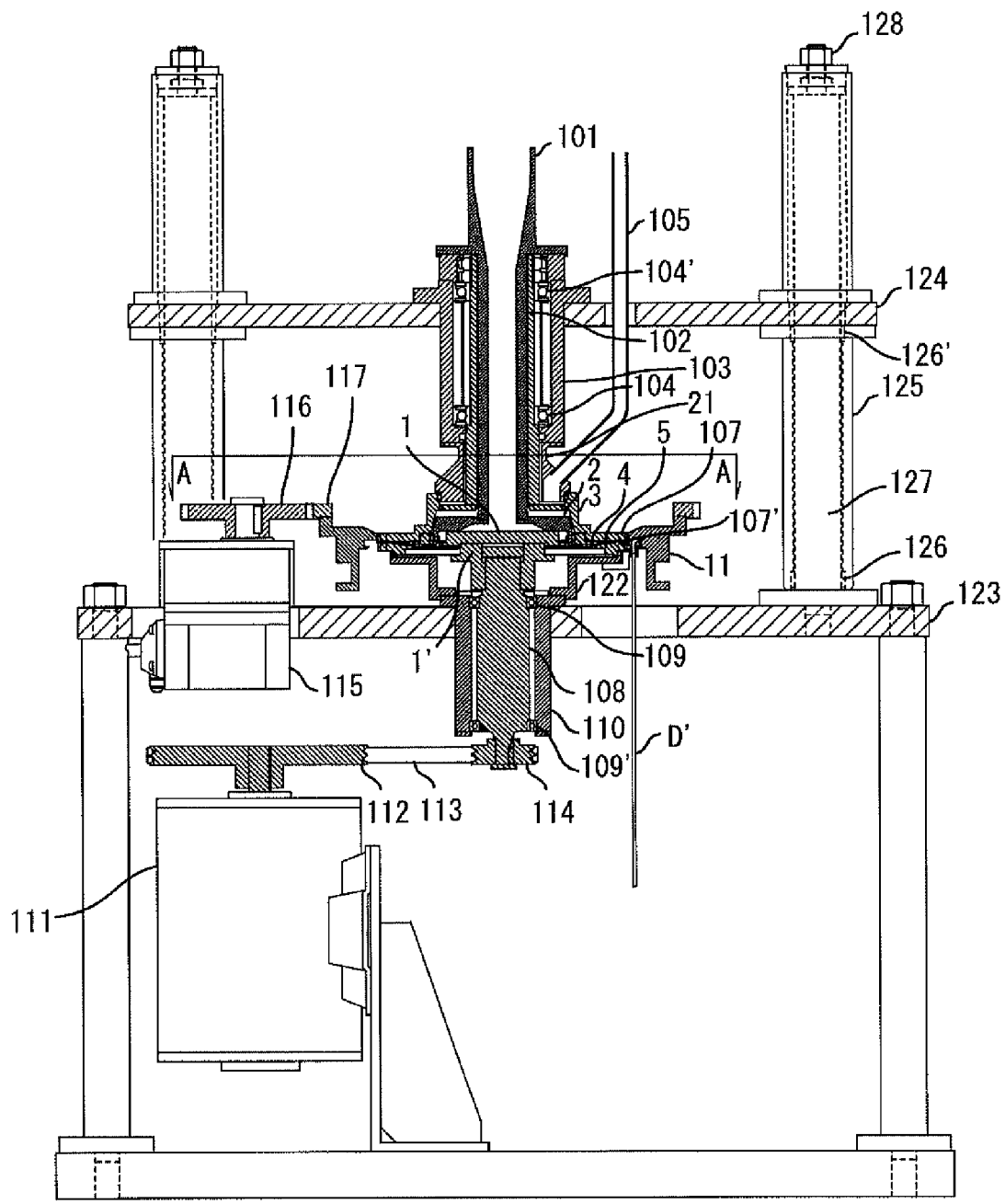
F I G. 1

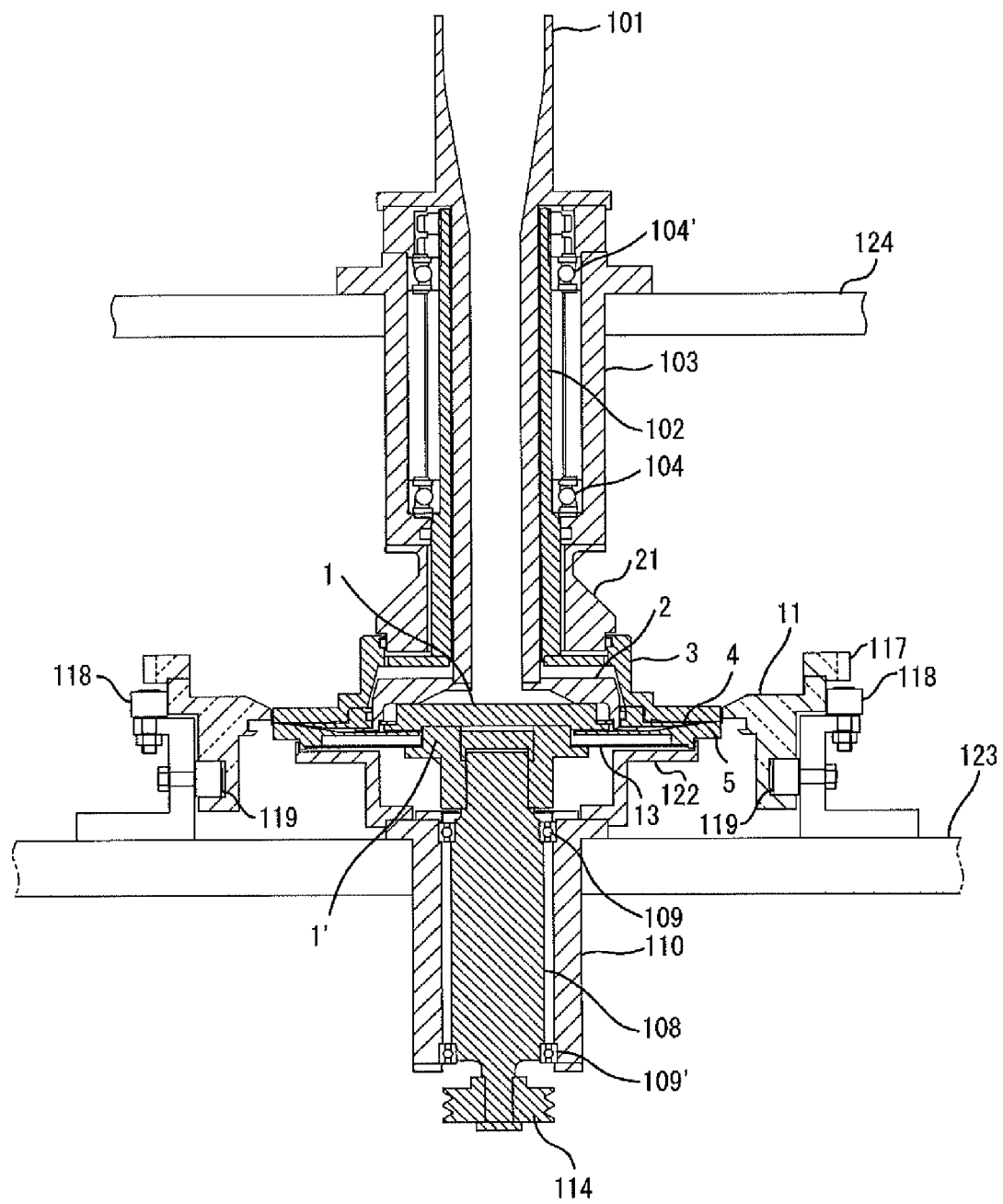
F I G. 2

MIXING APPARATUS FOR POWDER RAW MATERIAL AND LIQUID RAW MATERIAL AND METHOD FOR MANUFACTURING MIXTURE USING SAME

PRIORITY APPLICATION

This application is a U.S. National Stage Application being filed under 35 U.S.C. §371 from International Application No. PCT/JP2013/067058, filed on 21 Jun. 2013, and published as WO/2014/203390 A1 on 24 Dec. 2014; which application and publication are incorporated herein by reference in their entirety.

TECHNICAL FIELD

The present invention relates to a technology for continuously mixing powder raw materials and liquid raw materials.

BACKGROUND ART

In various industries such as the food industry, the chemical industry, and the electronic industry, apparatuses for mixing powder raw materials and liquid raw materials are used. In, for example, bread making, for the purpose of gelatinizing starch in processes of shaping and baking products, and for the purpose of organizing gluten for raising, the mixing of flour and water is a necessary and indispensable process. In noodle making, for the purposes of shaping products and organizing gluten for achieving good texture, the process of mixing flour and water is indispensable.

In terms of the mixing process, prior arts have a major problem. Before discussing such a problem, descriptions need to be given of gluten synthesized by adding water to flour and the importance of the organization.

Gluten is a material having both viscoelasticity and adhesiveness, and is generated when protein, which accounts for 6-15% of flour (this varies with the variety), is hydrated. Kneading dough that contains hydrated gluten bonds gluten molecules to each other, thereby forming a huge three-dimensional net-like organization.

The quality of wheat food such as bread and noodles depends largely on a gluten organization. In the case of bread, gluten controls how the bread is raised in response to the action of yeast, and determines texture. In the case of noodles, gluten is a main factor in what is called "koshi (sturdiness)" and "tsurumi (feeling of food or drink traveling down the throat)", and is also the most important factor in taste. To form a good organization, it is essential to first transfer all protein within wheat into gluten, and, for this reason, it is extremely important to spread water equally throughout in the mixing of wheat and water.

The following will describe a conventional general mixing method and problems thereof. To make noodles, batch-type mixers are often used. However, there is an unavoidable problem wherein gluten is synthesized and is simultaneously destroyed. In agitation mixing, mixing starts in one portion and then gradually spreads throughout. At positions where hydration initially occurs, gluten is immediately synthesized. Then, the gluten forms three-dimensional net-like organizations while capturing starch granules accounting for a majority of flour constituents. However, for positions where hydration is delayed, agitation needs to be continued. The mechanical action disadvantageously destroys gluten net-like organizations (which are actually weak). Moreover, this is fatal because destroyed gluten net-like organizations are unrenewable. That is, there is a contradiction wherein it is difficult to achieve both the completing of mixing and the forming of ideal gluten organizations.

As organizing progresses, viscosity increases and thus decreases fluidity, and heat is generated, thereby damaging the quality. Hence, equal hydration cannot be achieved by performing agitation alone.

Accordingly, a technique has been used wherein what is called "maturation", in which aging, remixing, and enlarging are repeated in turn, is performed in the subsequent process, and water is made to permeate by taking time and trouble. The process naturally becomes excessively long, and, for quality-oriented luxury items and thin noodles such as somen, several days are required for the process of fabrication. This requires large-scale equipment and space and many hands, and the fabrication cost becomes high as a matter of course.

For mass-produced products, costs are focused on, and hence a high-speed rotation mixer enabling continuous production is often used instead of a batch-type mixer. A representative example of that scheme is a high-speed mixer described in patent document 1.

An exemplary improved continuous mixer is a mixer described in patent document 2. The mixer apparatus drops filmy water on a powder layer spread out on a rotating disk and agitates and mixes them.

Patent documents 3 and 4 are known as other prior arts. The technology of patent document 3 relates to an apparatus that coats particulate matter such as plant seeds with a liquid such as oil or fat. The apparatus of patent document 3 supplies particulate matter to the center of a rotating disk from above, spreads it out on the disk, and causes liquid to flow down to the disk or sprays liquid thereon, thereby achieving continuous coating. The apparatus could possibly be used as an apparatus for mixing with liquid raw material by supplying powder raw material instead of particulate matter. To achieve homogeneous mixing for hydrating protein particles, it is essential to maintain exactly constant the flow rate of powder raw material supplied to the center of the rotating disk and to achieve a completely even flow in all directions.

In patent document 4, a powdery material is fed at a definite rate to the center of a disk, which is rotating at a moderate speed, to form a thin powder layer close to the periphery of the disk. On the other hand, a sprayer rotating at high speed is provided on the same axis as the rotating disk and a liquid material, which is fed at a definite rate, is continuously sprayed and radiated thereby. Thus, the liquid material is sprayed at a high speed from behind onto the powder layer flow having been spread on the rotating disk. As a result, a homogeneous and instantaneous bond is continuously formed at the micro level between these materials so that a homogeneous mixture of the powdery material with the liquid material can be continuously obtained. By homogeneously mixing the powdery material with the liquid material from the beginning, agitation becomes unnecessary, which makes it possible to prevent the mixture from denaturation in the qualities thereof. Moreover, it becomes possible to remarkably shorten the process and simplify the apparatus. In the case of using in mixing a powder material mainly comprising wheat flour with a liquid material mainly comprising water, in particular, the apparatus or the method as described above makes it possible to produce bread or noodles with excellent qualities by a shortened and simplified process.

PRIOR ART DOCUMENTS

Patent Documents

Patent document 1: Japanese Examined Patent Publication No. 61-21693
Patent document 2: Japanese Laid-open Patent Publication No. 2002-191953
Patent document 3: U.S. Pat. No. 3,017,854
Patent document 4: International Publication No. 2008/015756

SUMMARY OF INVENTION

Problems to be Solved by the Invention

However, the high-speed mixer of patent document 1 supplies water from one place, and this leads to uneven addition of water soon after water is supplied. The unevenness is eliminated through agitation with a fast-rotating blade so as to form bonds. However, an occurrence of shearing fracture of dough associated with agitation cannot be prevented yet.

The water addition method of patent document 2 achieves more efficient agitation because this method achieves superior equalities to those of the water addition method of patent document 1. However, the method produces dough with unequal water content, i.e., dough in a so-called soboro state, and noodles or bread cannot be made directly from the dough. Water diffusion from a portion with excess water does not progress in a simple aging process, and a kneader-based process still needs to be performed. That is, the dough quality is deteriorated due to an agitation effect provided by a kneader.

In making bread, agitation mixing is performed using the apparatus described in cited document 1 or 2, and it is difficult to avoid the problem described above, leading to a problem in obtaining good gluten organizations. To achieve smooth raising by reinforcing gluten organizations, some makers even use potassium bromate, a carcinogen, as an additive. The makers say that safety has been confirmed because the carcinogen is totally decomposed in a baking process. However, some consumer organizations continue to make complaints, and the use of potassium bromate is controlled in some countries (e.g., the EU, Canada, and China), i.e., it cannot be determined that discussions on safety have been concluded. The fact that makers risk continuing to use potassium bromate clearly indicates the importance of the generation of gluten organizations and the difficulty of making good gluten organizations.

Dough is kneaded by hand to achieve high quality, and this requires skill and effort. Aging-based water diffusion requires a refrigerator for suppressing abnormal fermentation. In making bread, it is again difficult to achieve a balance between quality and cost.

In regard to the apparatus of patent document 3, powder typically includes fine particles and the behavior of an aggregation of the particles is thus extensively controlled by friction, and, unlike in the case of a liquid, a layer thickness is not autonomously leveled. This results in large variations in the mixing ratio in a mixture and thus makes the quality of the mixture imperfect. In patent document 3, a liquid raw material flows down to or is sprayed onto a particulate-matter raw material spread out on a disk, in a manner such that the liquid raw material comes into contact with and is mixed with the particulate matter raw material. A method wherein a liquid raw material flows down to and comes in contact with a particulate-matter raw material is similar to the method of patent document 1, and the mixing becomes uneven for the same reason as described above. Even when a liquid raw material is brought into contact with a powder raw material by spraying, mixing cannot, in theory, be made to be even at a micro level. This is because simply spraying a liquid raw material onto a powder raw material leads to a difference in how droplets are received at an outer layer portion and a lower layer portion, and no means is provided for switching the outer layer portion and the lower layer portion.

The apparatus of patent document 4 continuously sprays and radiates a liquid raw material fed at a definite rate and sprays the liquid material at a high speed from behind onto a powder layer flow spread on a rotating disk, but, in practice, a homogeneous and instantaneous bond was not continuously formed at a micro level between these materials. In particular, powder could not be evenly spread, and liquid was sprayed onto only the surface of the powder, i.e., water did not reach the inside, and, moreover, wasteful scatter of powder was unable to be resolved.

As described above, the mixing of powder and a liquid based on the prior arts has major problems.

In view of the problems above, the present invention provides a mixing apparatus that evenly mixes a powder material and a liquid material.

Means for Solving the Problems

A mixing apparatus in accordance with the present invention includes a first disk, a second disk, a third disk, a fourth disk, and a fifth disk. The first disk rotates on a vertical axis and radiates a powder raw material supplied from the vertical axis direction in an outer edge direction. The second disk is a stationary disk separated from the top surface of the first disk by a predetermined distance. The second disk is provided in a manner such that the powder raw material radiated on the first disk is leveled in passing through a first gap formed by separating the second disk by the predetermined distance. The third disk covers the second disk, rotates on the same axis as the first disk, and includes an atomizing head that atomizes and radiates in an outer edge direction a liquid raw material supplied while the third disk is rotating. The fourth disk has a shorter diameter than that of the third disk, is fixed to the third disk and separated from the under surface of the third disk by a predetermined distance, and rotates on the same axis as, and in an integrated manner with, the third disk. The fourth disk includes, at an outermost portion, a horizontal top surface and an under surface inclined upward toward an outer edge. The fourth disk is provided in a manner such that the atomized liquid material passes through a second gap formed between the top surface of the fourth disk and the under surface of the third disk. The fifth disk is provided below the fourth disk, is separated from the under surface of the fourth disk by a predetermined distance, rotates on the same axis as, and in an integrated manner with, the first disk, and has a diameter that is longer than that of the fourth disk. The fifth disk is provided in a manner such that the powder raw material leveled by the second disk passes through a third gap formed between the top surface of the fifth disk and the under surface of the fourth disk. The fourth gap is provided in a manner such that the under surface on the outer edge side of the third disk and the top surface on the outer edge side of the fifth disk face and fit each other in such a manner as to sandwich the fourth disk from the top surface direction and under surface direction of the fourth disk. The fourth gap is formed between the outer edge of the fourth disk, the under surface on the outer edge side of the third disk, and the top surface on the outer edge side of the fifth disk. In the fourth gap, a mixture of the liquid raw material radiated from the second gap and the powder raw material radiated from the third gap is deposited on a portion where the third disk and the fifth disk face and fit each other. In accordance with the amount of the deposited mixture and a centrifugal force applied to the mixture, the third disk is pushed up, or the fifth disk is pushed down, to radiate the mixture in circumference directions of the third and fifth disks.

The mixing apparatus further includes a toric member and a collecting unit. The toric member is a member shaped like a torus having an inside diameter in which the third and fifth disks are located, and deposits the mixture radiated from the outer edges of the third and fifth disks on a side face of the inside diameter. The collecting unit strips off the mixture deposited on the side face of the inside diameter of the toric member.

A portion of the fifth disk below the first gap is supported by an elastic member having elasticity in a vertical direction. Magnets are implanted in the third and fifth disks such that these disks face and fit each other.

A method for mixing a powder material and a liquid material using a mixing apparatus in accordance with the invention is as follows. The mixing apparatus in accordance with the invention includes a first disk, a second disk, a third disk, a fourth disk, and a fifth disk. The first disk rotates on a vertical axis and radiates a powder raw material supplied from the vertical axis direction in an outer edge direction. The second disk is a stationary disk separated from the top surface of the first disk by a predetermined distance. The third disk covers the second disk and rotates on the same axis as the first disk. The third disk includes an atomizing head that atomizes and radiates a liquid raw material supplied while rotating in an outer edge direction. The fourth disk has a shorter diameter than that of the third disk and is fixed to the third disk and separated from the under surface of the third disk by a predetermined distance. The fourth disk rotates on the same axis as, and in an integrated manner with, the third disk. The fourth disk includes, at an outermost portion, a horizontal top surface and an under surface inclined upward toward an outer edge. The fifth disk is provided below the fourth disk and is separated from the under surface of the fourth disk by a predetermined distance. The fifth disk rotates on the same axis as, and in an integrated manner with, the first disk. The fifth disk has a diameter that is longer than that of the fourth disk. In the mixing method, the powder raw material radiated on the first disk passes through, and is leveled by, a first gap formed between the first and second disks. The atomized liquid material passes through a second gap formed between the top surface of the fourth disk and the under surface of the third disk. The powder material leveled by the second disk passes through a third gap formed between the top surface of the fifth disk and the under surface of the fourth disk. In a fourth gap, the liquid raw material radiated from the second gap is bound to the powder raw material radiated from the third gap. The fourth gap is formed between the outer edge of the fourth disk, the under surface on the outer edge side of the third disk, and the top surface on the outer edge side of the fifth disk in a condition in which the under surface on the outer edge side of the third disk and the top surface on the outer edge side of the fifth disk face and fit each other in such a manner as to sandwich the fourth disk from the top surface direction and under surface direction of the fourth disk. The mixture of the liquid raw material and the powder raw material is deposited on a portion where the third disk and the fifth disk face and fit each other. In accordance with the amount of the deposited mixture and a centrifugal force applied to the mixture, the third disk is pushed up, or the fifth disk is pushed down. Consequently, the mixture is radiated in circumference directions of the third and fifth disks.

Effect of the Invention

The present invention allows a powder material and a liquid material to be evenly mixed with each other.

BRIEF DESCRIPTION OF THE DRAWINGS

FIG. 1 is a cross-sectional view of a mixing apparatus as seen from an X direction in accordance with the invention;

FIG. 2 is a cross-sectional view of a mixing apparatus as seen from a Y direction in accordance with the invention;

MODE FOR CARRYING OUT THE INVENTION

The following will describe embodiments of the invention. A direction on a horizontal plane will hereinafter be referred to as an X direction, and a direction on the horizontal plane that is orthogonal to the X direction will hereinafter be referred to as a Y direction.

Figure 3:
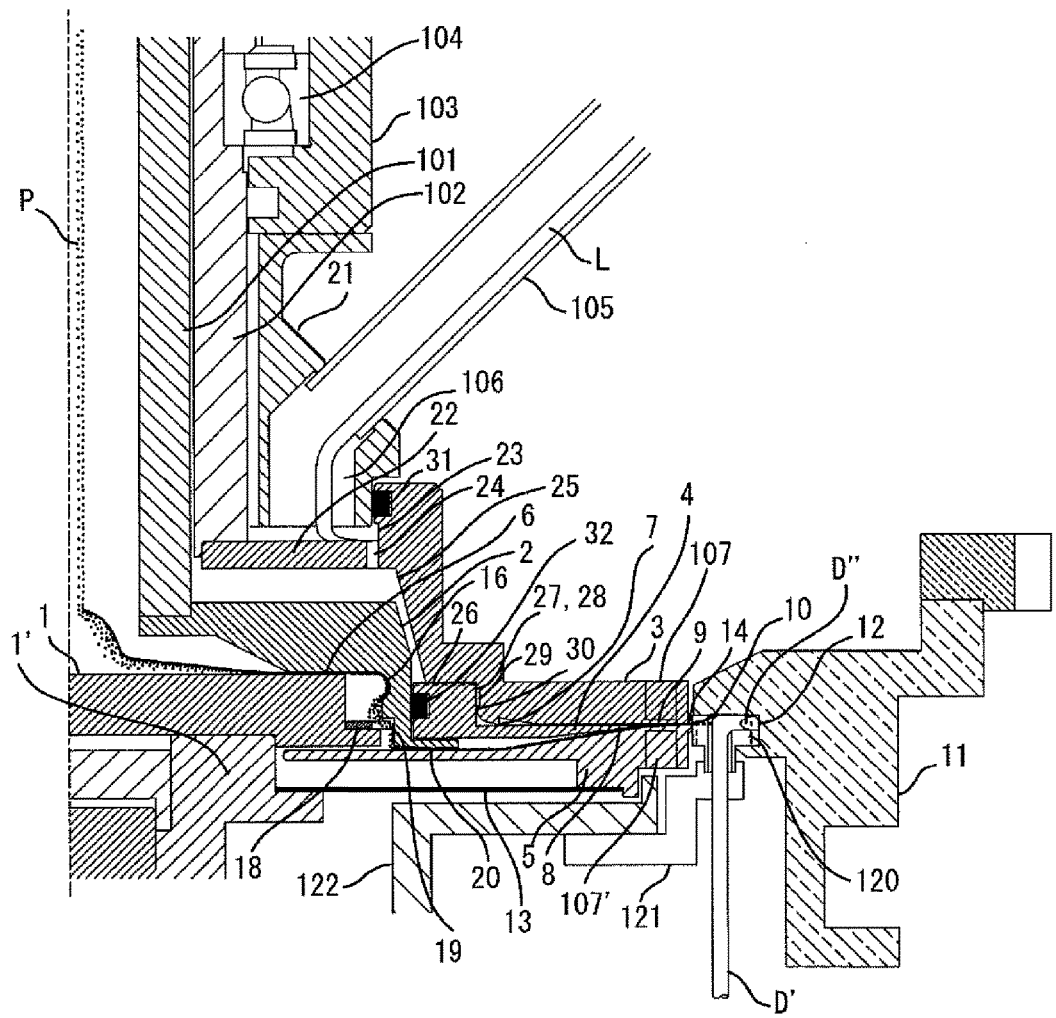
FIG. 3 is a cross-sectional view of a main portion of a mixing apparatus as seen from an X direction in accordance with the invention.
Figure 4:
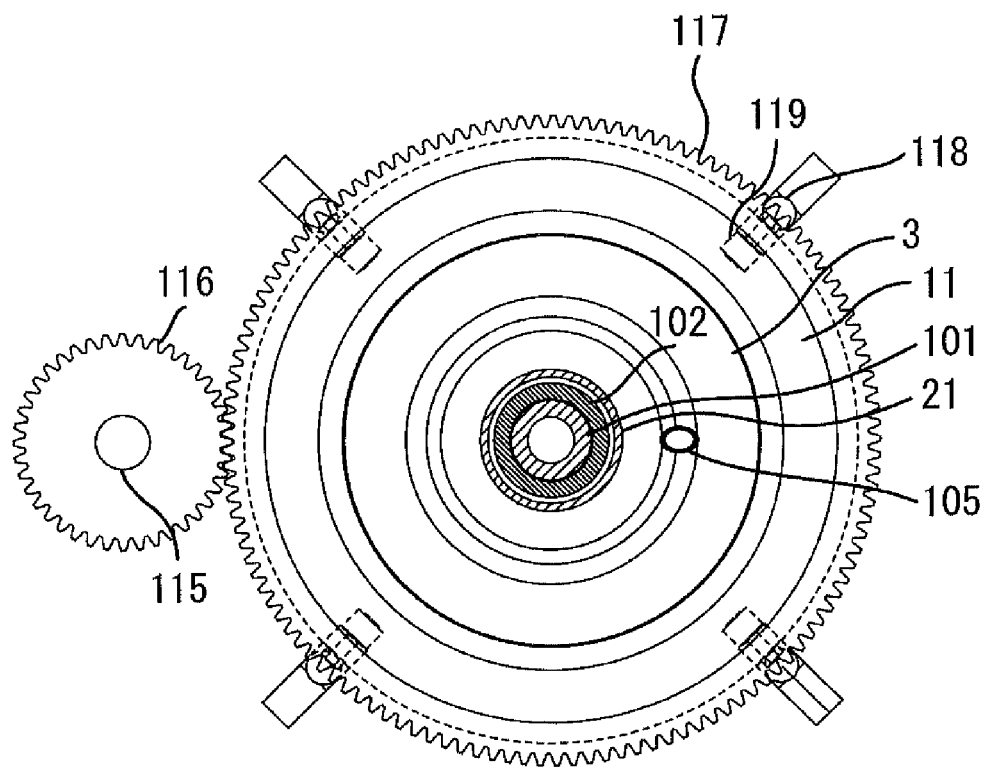
FIG. 4 is a cross-sectional view taken on line A-A of FIG. 1.

FIG. 1 is a cross-sectional view of a mixing apparatus as seen from the X direction in accordance with the invention. FIG. 2 is a cross-sectional view of a mixing apparatus as seen from the Y direction in accordance with the invention. FIG. 3 is a cross-sectional view of a main portion of a mixing apparatus as seen from the X direction in accordance with the invention. FIG. 4 is a cross-sectional view taken on line A-A of FIG. 1.

The mixing apparatus comprises mainly of an apparatus for supplying a powder raw material at a constant rate (not illustrated, and hereinafter referred to as a "powder-rawmaterial constant rate supplying apparatus"), a rotating disk 1, a rotating disk 1', a stationary disk 2, a rotating disk 3, a rotating disk 4, a rotating disk 5, a toric member 11, a guide 21, a funnel 101, a hollow shaft 102, a housing 103, a pipe 105, a small magnet 107, a small magnet 107', a rotation shaft 108, a housing 110, a motor 111, a large pulley 112, a belt 113, a small pulley 114, a reduction-gear-equipped motor 115, gears 116 and 117, cam followers 118 and 119, a scraper 120, a support 121, a cover 122, a middle base plate 123, and an upper base plate 124.

A mixing apparatus in accordance with an embodiment instantly completely mixes a powder raw material and a liquid raw material. This may prevent a mechanical effect from being applied to and damaging a mixture in a mixing process. Specifically, applying the mixing apparatus to the mixing of wheat flour and water can add water equally to all protein within the wheat flour and may prevent net-like organizations of gluten from being destroyed, thereby improving qualities. Moreover, the process is simplified and shortened and thus provides an advantage in decreasing the cost of fabrication. This means that the embodiment provides an ideal mixing method.

As will be described hereinafter, a mixing apparatus capable of continuously mixing a powder material and a liquid material in accordance with the invention supplies a powder material to the center of the rotating disk 1 at a constant rate in such a manner as to rotate and spread out the powder material in a direction with a longer diameter. The mixing apparatus causes the powder raw material to pass through a gap between the rotating disk 1 and the stationary disk 2, i.e., a stationary disk located above the rotating disk 1, so as to level a layer thickness, and then drops the powder raw material on the rotating disk 5, which is located below the rotating disk 1 and has a longer diameter than that of the rotating disk 1.

The rotating disk 3, i.e., a bell-shape rotating disk that rotates on the same axis as, and at the same rate as, the rotating disk 1, covers the stationary disk 2. The film thickness of a flow of a supplied liquid raw material is made to be even at a position close to the center of the rotating disk 3. The flow of the liquid material with an even thickness is guided to a sprayer head 7, which atomizes and radiates the flow in a horizontal direction. The rotating disk 4, which has a periphery with an acute-angled edge, is fixed below the rotating disk 3. The rotating disk 4 has, at a portion with a longer diameter than that of the sprayer head 7, a horizontal gap space between the rotating disk 4 and the under surface of the rotating disk 3, and has an inclined gap space (gap portion 8) between the rotating disk 4 and the rotating disk 5.

In a space 36, i.e., a flat and horizontal space in an upper space, particulate droplet swarms of the liquid raw material radiated equally in all directions fly at a high speed in a horizontal direction. The powder raw material is spread out while floating in a lower gap space. The liquid raw material and the powder raw material are merged and mixed with each other within a tapered wedge-shaped space located outside the periphery of the rotating disk 4. The mixture is released from an open end 10, which is located at a tip of the wedge-shaped space. The released mixture is deposited on an inner concave surface 12 of the toric member 11, i.e., a toric member provided outside. The mixture deposited on the inner concave surface 12 may be collected and obtained.

The rotating disk 5 has high elasticity in a vertical direction. A portion of the rotating disk 5 at a smallest gap portion 14, which is close to the periphery, is in contact with the rotating disk 3 with a predetermined suitable contact force. When the mixing starts, the particulate droplets and dispersed particles of the powder raw material are accumulated at the contact point in the smallest gap portion 14. Condensation starts at the contact point. A generated condensate changes into a minute bound substance because of a large centrifugal acceleration, thereby applying a wedge effect to upper and lower walls. The wedge effect increases with an increase in a condensation region C and ultimately exceeds the contact force, and this immediately pushes down the elastically supported rotating disk 5, with the result that the accumulation is resolved and the mixture is radiated from the open end 10. Excessively pushing down the rotating disk 5 decreases the condensation region C, thereby decreasing the force to push down the rotating disk 5, and this decreases a radiant quantity. Accordingly, the condensation region C is automatically adjusted and settles in a steady state. Consequently, the mixing and the radiation of the bound substance are stabilized in a favorable state.

The toric member 11, i.e., a member that has the inner concave surface 12, rotates on the same axis as, for example, the rotating disk 1. Accordingly, providing a relatively fixed scraper 120 at a predetermined portion of the toric member 11 allows a mixture deposited on the toric member 11 to be continuously extracted.

Supplying a powder raw material containing wheat flour and a liquid raw material containing water to the mixing apparatus in accordance with the invention allows a high-quality food containing wheat flour as a main material to be fabricated at low cost. In using the mixing apparatus in accordance with the invention so as to make a food containing wheat flour as a main material and having an oil and fat raw material added thereto, the oil and fat raw material is emulsified and put in water in advance. This makes the quality of the food high at low cost.

The following will describe the mixing apparatus in accordance with the embodiment in more detail.

Referring to FIGS. 1-3, the rotating disks 1 and 1', an elastic member 13, and the rotating disk 5 are fixed in a manner such that these elements can rotate on the same axis, i.e., rotate in an integrated manner. The rotating disks land 1', the elastic member 13, and the rotating disk 5 are integrated into a structure A. The rotating disks 3 and 4, a horizontal member 22, and the hollow shaft 102 are fixed in a manner such that these elements can rotate on the same axis, i.e., rotate in an integrated manner. The rotating disks 3 and 4, the horizontal member 22, and the hollow shaft 102 are integrated into a structure B. As will be described hereinafter, the structures A and B are fixed by the small magnets 107 and 107' and, accordingly, rotate on the same axis at the same rotational speed.

The powder-raw-material constant rate supplying apparatus supplies a powder raw material at a constant rate. The housing 110 houses bearings 109 and 109'. The rotating disk 1 is fixed to the rotation shaft 108, which is supported by the bearings 109 and 109', and can be rotated at a high speed by the motor 111, the large pulley 112, the belt 113, and the small pulley 114.

Figure 5:
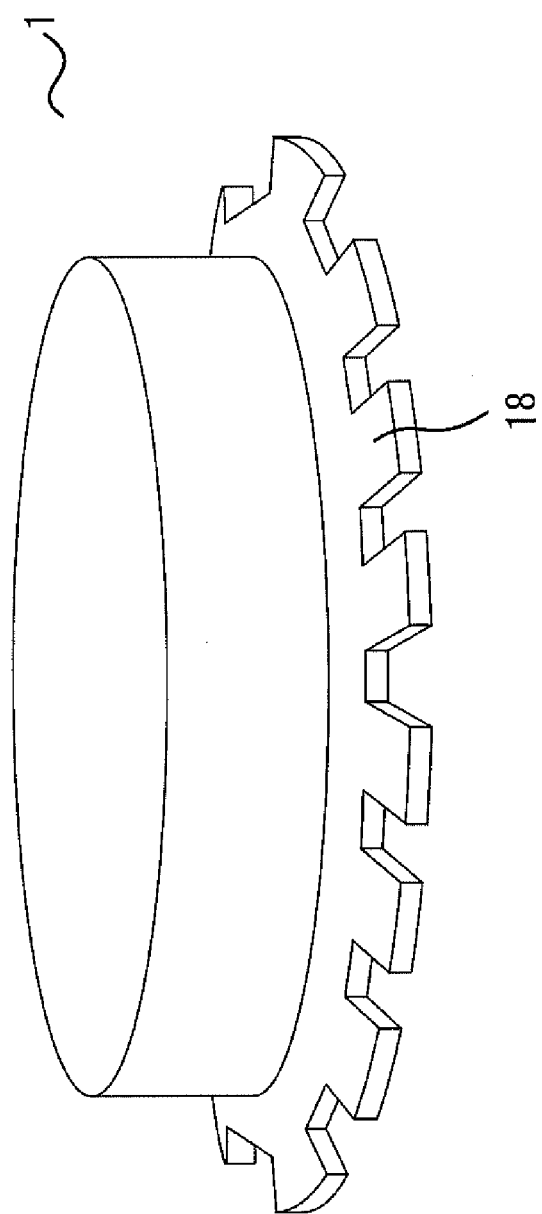
FIG. 5 is a perspective view (conceptual diagram) of a rotating disk 1.

FIG. 5 is a perspective view (conceptual diagram) of the rotating disk 1. A circular-saw-shaped aggregate crusher plate 18 is provided at a flange of the rotating disk 1. The rotating disk 1 is supported by the rotating disk 1', i.e., a disk integrated with the rotating disk 1.

Figure 6:
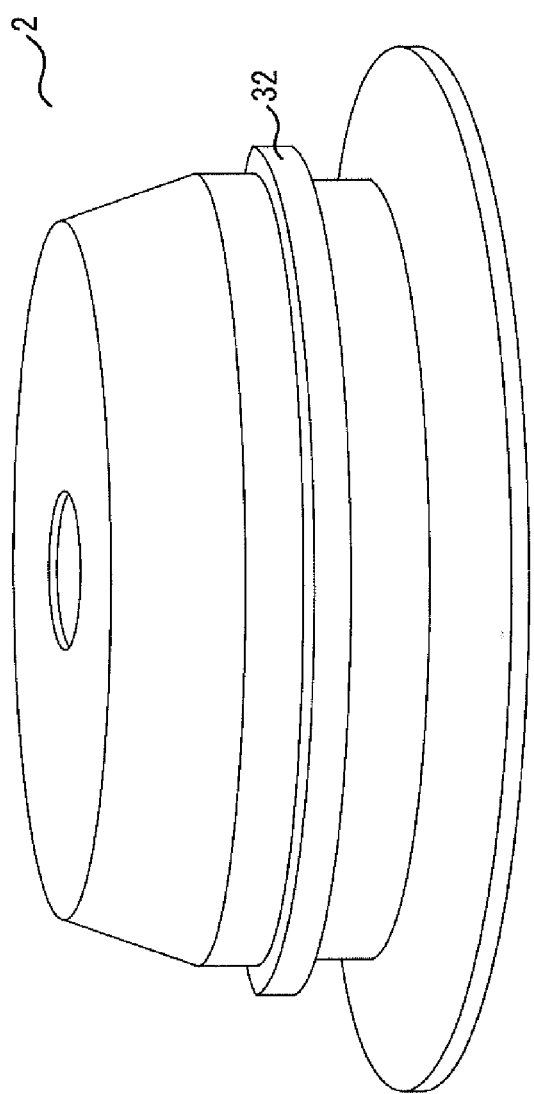
FIG. 6 is a perspective view (conceptual diagram) of a stationary disk 2.

FIG. 6 is a perspective view (conceptual diagram) of the stationary disk 2. The stationary disk 2 is a disk that remains at rest and has, on a top surface thereof, an opening for connection to a bottom end of the funnel 101. A ceiling 32 is provided on a side surface of the stationary disk 2, and a flange is provided at the lower end. The stationary disk 2 has a hollow structure and is located so as to cover the rotating disk 1. The ceiling 32 is provided to eliminate the likelihood of a powder raw material within a space outside a gap part 20 entering a space on the inside of a slope 25 and being mixed with a liquid raw material.

Figure 7:
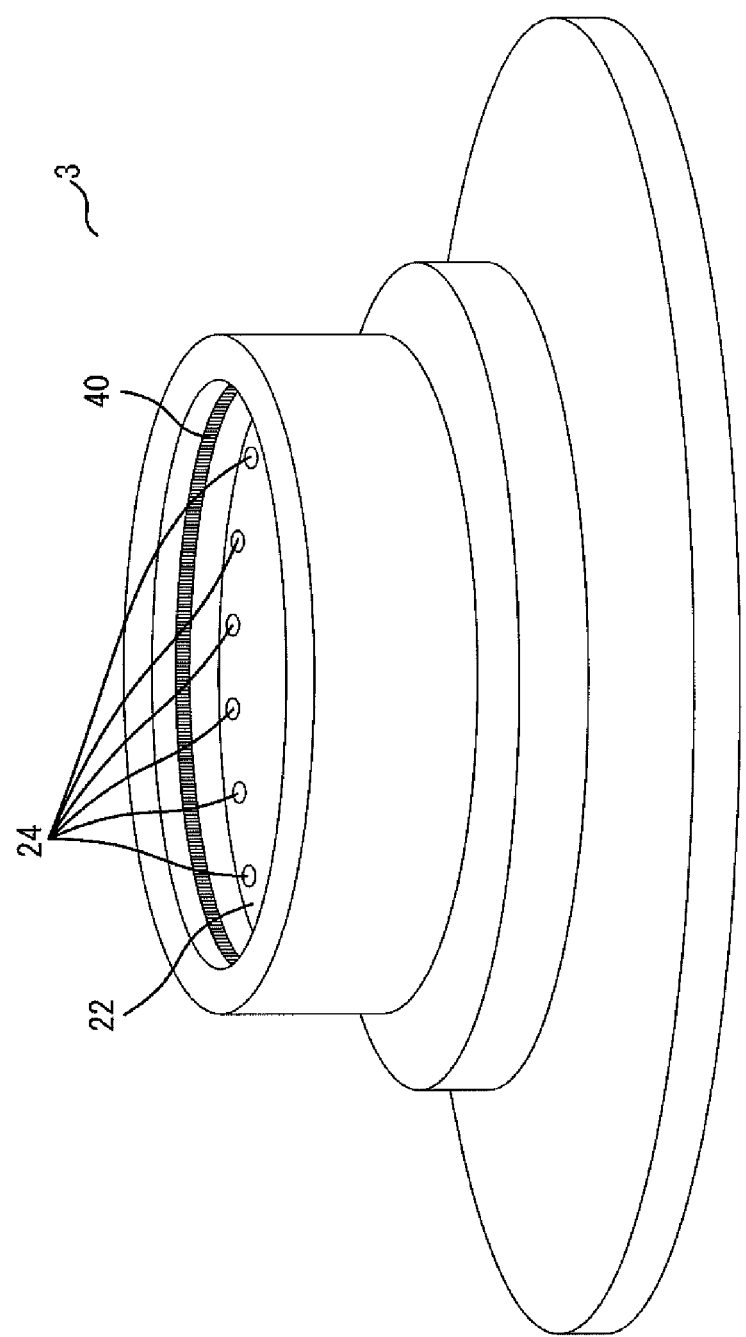
FIG. 7 is a perspective view (conceptual diagram) of a rotating disk 3.

FIG. 7 is a perspective view (conceptual diagram) of the rotating disk 3. The horizontal member 22 is positioned lower than the upper end of the rotating disk 3. Holes 24 are arranged along the periphery of the horizontal member. Grooves 40 that mate with a ceiling 31 are on an inside diameter side surface between the upper end of the rotating disk 3 and the horizontal member 22. A two-tiered flange is provided at a lower portion of the rotating disk 3. The rotating disk 3 has a hollow structure such that the stationary disk 2 can be covered. An under surface of the two-tiered flange has a step-wise shape, and the rotating disk 4 is fixed to the steps.

Figure 8:
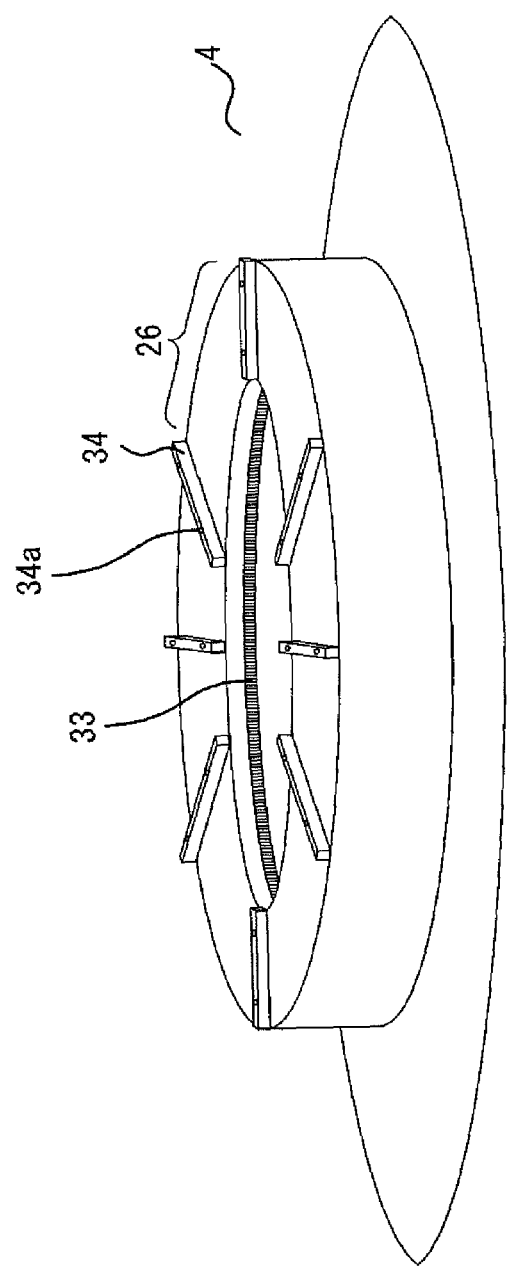
FIG. 8 is a perspective view (conceptual diagram) of a rotating disk 4.

FIG. 8 is a perspective view (conceptual diagram) of the rotating disk 4. The rotating disk 4 has a ring structure, and the stationary disk 2 can pass through a space surrounded by an inside diameter. Grooves 33 are provided on the side surface of the inside diameter of the rotating disk 4, wherein the grooves 33 mate with the ceiling 32 of the stationary disk 2 when the stationary disk 2 has passed through an opening of the rotating disk 4. A plurality of parting strips 34 are arranged on the top surface of the rotating disk 4 at equal intervals in a radial direction. The parting strip 34 has formed thereon a hole 34a through which a screw passes. A screw is made to pass through the hole 34a so as to fix the rotating disk 4 to the steps of the under surface of the rotating disk 3. A groove 26 is a region sandwiched between parting strips 34. A flange is provided at a lower end of the rotating disk 4. The portion of the flange of the rotating disk 4 extending from an inside diameter toward an outside diameter and terminating at a predetermined position (inner portion) has a uniform thickness. A portion extending from the predetermined position to an edge (outer portion) is inclined and becomes thinner toward the edge.

Figure 9:
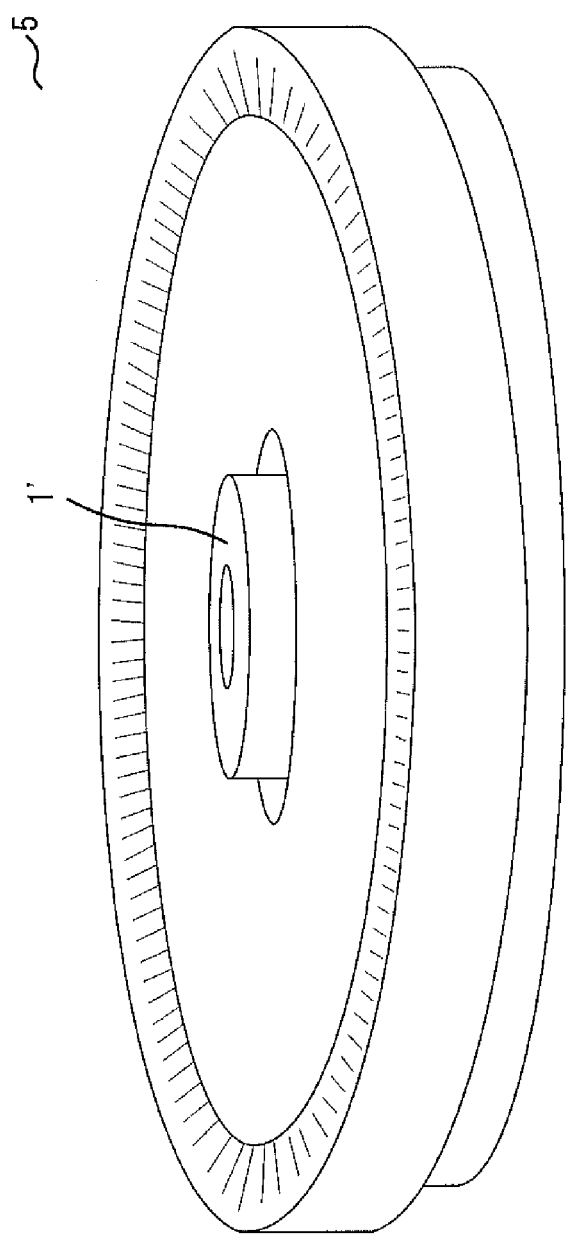
FIG. 9 is a perspective view (conceptual diagram) of a rotating disk 5.

FIG. 9 is a perspective view (conceptual diagram) of the rotating disk 5. An opening through which the rotating disk 1' passes is provided at a central portion of the top surface of the rotating disk 5. A portion of the top surface of the rotating disk 5 extending from the central portion toward a periphery and terminating at a predetermined position (inner portion) is horizontal, and a portion extending from the predetermined position to an edge (outer portion) is inclined.

<Flow of Powder Raw Material>

First, descriptions will be given of a flow of a powder raw material. Referring to FIG. 3, a powder raw material P is pushed out of a powder-raw-material constant rate supplying apparatus (not illustrated) and falls through the funnel 101 to a position close to the center of the rotating disk 1.

The powder raw material P falls onto the central portion of the rotating disk 1, i.e., a disk rotating at a high speed, starts rotating, and is accelerated in a radial direction by a generated centrifugal force. In accordance with the rotation, a portion of a layer of the powder raw material P further in a radial direction becomes thinner, and the layer of the powder raw material P spreads out in an outer direction, simultaneously making a curve, while gradually increasing in rotational speed and radial-direction speed.

While the speedup caused by the spreading is decreasing the thickness of the powder raw material layer, the powder raw material enters the gap portion 6 below the stationary disk 2, i.e., a disk attached to the bottom end of the funnel 101.

Figure 10:
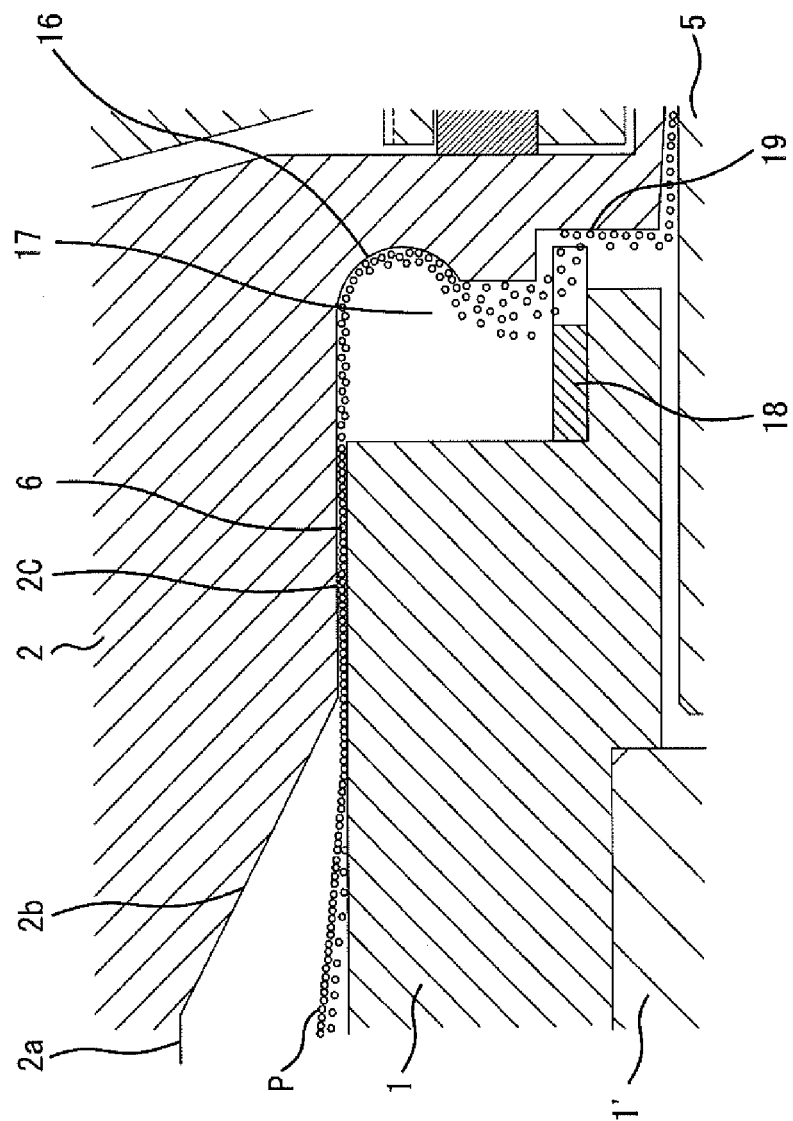
FIG. 10 is an enlarged view of an area close to a gap portion 6.

FIG. 10 is an enlarged view of an area close to the gap portion 6. With reference to an inside upper wall of the stationary disk 2, a flat surface 2a extends from the center to a predetermined position from which a slant 2b extends. Both the slant and the flat surface 2a extend to the predetermined position from where a flat surface 2c extends. The gap portion 6 is a gap between the top surface of the rotating disk 1 and a flat surface 2c of the stationary disk 2. The height of the gap portion 6 is greater than a maximum particle size of the powder raw material. The stationary disk 2 applies a leveling effect to the powder raw material layer, but the rotating disk 1 continues to apply a turning force to the powder raw material layer. Hence, the flow toward a portion with a larger diameter continues. Ultimately, the powder raw material P is released from the gap portion 6 almost equally in all directions.

After moving along a curved inside surface 16 of the stationary disk 2, the powder raw material floats within a space 17 and then falls onto a tooth of the circular-saw-shaped aggregate crusher plate 18. A certain amount of powder raw material is stored in the space 17, thereby providing a function to level the powder raw material when there is a small variation in the supply thereof.

The aggregate crusher plate 18, which has a gear-teeth planar shape as depicted in FIG. 5, is fixed to the rotating disk 1 and rotates at a high speed. The powder raw material P, which has floated down to the aggregate crusher plate 18, is hit by a vertical surface of the gear teeth, then runs into a vertical wall 19 of the stationary disk 2, and finally falls onto the rotating disk 5. The two impacts disintegrate the aggregate that has passed through the gap portion 6, and the powder raw material P falls onto the rotating disk 5 in a free state.

The rotating disk 5 is attached to the rotating disk 1', i.e., a rotating disk integrated with the rotating disk 1, via the elastic member 13. Spring tension of the elastic member 13 applies an upward force to the rotating disk 5 and thus presses the rotating disk 5 against the rotating disk 3. The powder raw material is again subject to a leveling effect while passing through the gap part 20, i.e., a gap formed between the flange of the stationary disk 2 and the rotating disk 5, forms a flow that is more equal in all directions than that formed at the exit of the gap portion 6, and flows into the gap portion 8. The gap portion 8 is a gap between an inclined surface of the under surfaces of the flange of the rotating disk 4 and an inclined surface of the top surfaces of the rotating disk 5. The height of the gap portion 8 is greater than the maximum particle size of the powder raw material. The height of the gap part 20 is greater than the maximum particle size of the powder raw material.

<Flow of Liquid Raw Material>

The following will describe a sequence of processes leading from the supplying of a liquid raw material to the atomizing thereof. The pipe 105 depicted in FIGS. 1 and 2 is a pipe through which a liquid raw material L flows down that is supplied from an apparatus located at an upper position for supplying the liquid raw material at a constant rate (not illustrated). The pipe 105 is inserted into a flow channel hole 106 of the guide 21 fixed to the bottom end surface of the housing 103. A plurality of pipes 105 may be provided to simultaneously supply a plurality of liquid raw materials. As depicted in FIG. 3, the guide 21 is preferably provided with the ceiling 31 to prevent external leakage of splashes of the liquid raw material L.

The hollow shaft 102 is supported by bearings 104 and 104' inserted into the housing 103 and is rotatable on the same axis as the rotation shaft 108. A plurality of small high-powered magnets 107 are implanted at positions close to an outermost portion of the rotating disk 3, i.e., a rotating disk attached to the bottom end of the hollow shaft 102. The small magnets 107 implanted in the rotating disk 3 and small magnets 107' implanted at equivalent positions on the rotating disk 5 attract each other.

Turning on the motor 111 to start rotating the rotating disk 5 immediately creates gaps between the small magnets 107 and 107', thereby generating an attractive force in a horizontal direction. Consequently, a turning force is transmitted from the rotating disk 5 to the rotating disk 3. At the time of starting the operation, as long as the motor 111 is not excessively suddenly accelerated, the rotating disk 3 may rotate in synchrony with the rotating disk 5.

Needless to say, the attractive force between the small magnets 107 and 107' assists a contact force generated by the elastic member 13.

Referring to FIG. 3, during a mixing operation, the liquid raw material L poured onto the top surface of the horizontal member 22 of the rotating disk 3 immediately starts rotating at a high speed, and accordingly the liquid raw material L is also accelerated in a radial direction and is stored in a liquid reservoir 23 provided at the rotating disk 3. When the liquid raw material L reaches the liquid reservoir 23, the rotational speed of the liquid raw material L becomes equal to that of the rotating disk 3. Due to a strong centrifugal force caused by the high speed rotation of the rotating disk 3, the surface of the liquid within the liquid reservoir 23 is essentially vertically inclined.

A plurality of holes 24 are provided on a portion of the horizontal member 22 that is close to the liquid reservoir 23, and the liquid raw material tends to flow in a direction with a large diameter because of a strong centrifugal force. Accordingly, before the liquid reservoir 23 is filled with the liquid raw material L, the liquid raw material L flows at a position distant from a rotation shaft within an inner portion of the hole 24 and then reaches a lower side of the horizontal member 22. Then, the liquid raw material L flows to the slope 25, passes through the groove 26 provided on the top surface of the rotating disk 4 as depicted in FIG. 8, and flows to the minute gap 27, i.e., a vertical gap.

Figure 11:
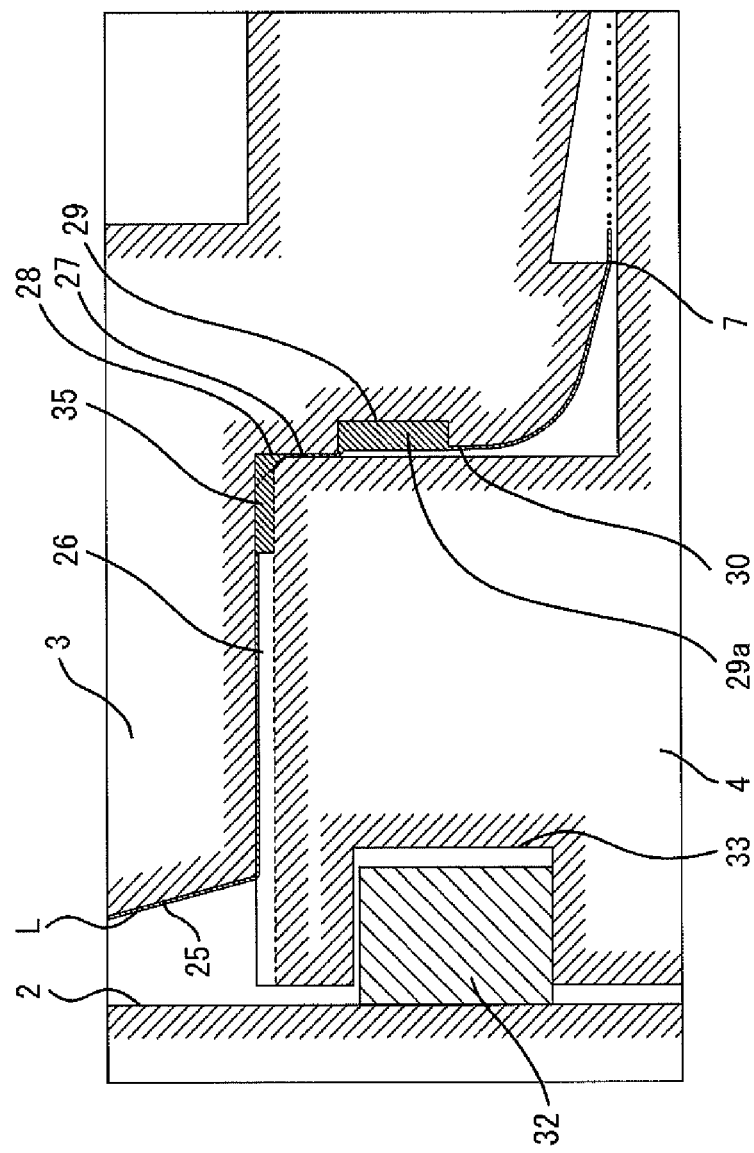
FIG. 11 is an enlarged view of an area close to a minute gap 27.

FIG. 11 is an enlarged view of an area close to the minute gap 27. The minute gap 27 is remarkably narrow, and hence, initially, not all liquid raw material L can pass through the minute gap 27, thereby making a puddle 29a within a groove 29, as depicted in FIG. 11. Accordingly, an extremely strong centrifugal force applied to the liquid raw material L increases a pressure at a position close to a vertical wall 28 of the liquid raw material in proportion to the amount of the puddle. The quantity of the flow through the minute gap 27 is eventually balanced with the quantity of inflow from the slope 25. Subsequently, the liquid raw material flows into the groove 29 and temporarily stays therein. The quantity of inflow at that moment is unequal because the flow has just passed through the groove 26, but the distance from the surface of the liquid within the groove 29 to the rotation center of the rotating disk 3 is equal because of a strong centrifugal force. The radius of a vertical wall 30 located at a lower position is slightly greater than the vertical wall 28, and the distance from the rotation center is equal for the entire perimeter. Consequently, an equal quantity of liquid raw material L having an equal thickness overflows the groove 29 in absolutely all directions.

The liquid raw material L that has overflown the groove 29 flows along the vertical wall 30 while maintaining a thin-film-like shape, and reaches the sprayer head 7 after passing by a curved surface. The liquid film loses support at the sprayer head 7 and is disintegrated into innumerable particulate droplets just after leaving the sprayer head 7. For evenness of the mixing, the particle size of the particulate droplets is preferably equal to or less than the particle size of the powder raw material. A main factor of the size is a physical property of the liquid raw material. However, conditions for the physical property cannot be optionally changed. Accordingly, the size may be adjusted by adjusting a radius position of the sprayer head 7, the rotational speed of the rotating disk 3, or the supply of the liquid raw material.

The particulate droplets achieve an equal space density in all directions as an inevitable result of the fact that the liquid raw material L that has overflown the groove 29 has no deflection. A space 9 with a wedge-shaped cross section is provided ahead of the sprayer head 7. Accordingly, particulate droplets of the liquid raw material L and dispersed particle swarms of wheat simultaneously flow into the space 9.

Figure 12:
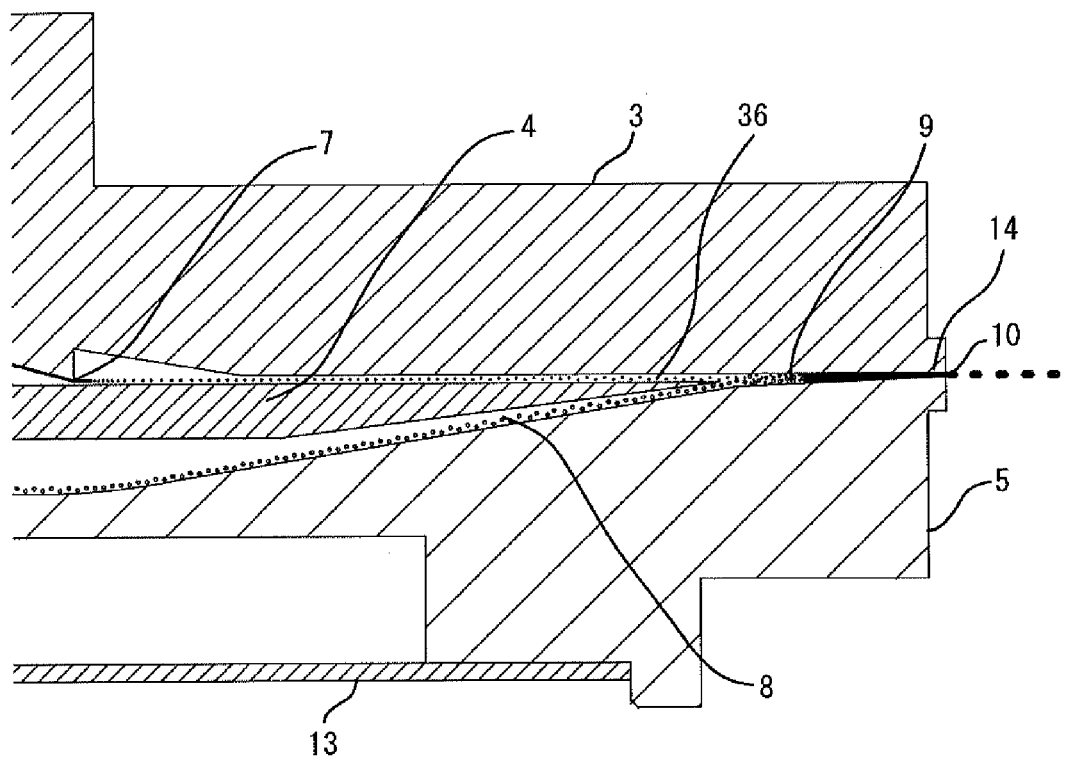
FIG. 12 is an enlarged view of a cross section of rotating disks 3, 4, and 5 depicted in FIG. 3.
Figure 13:
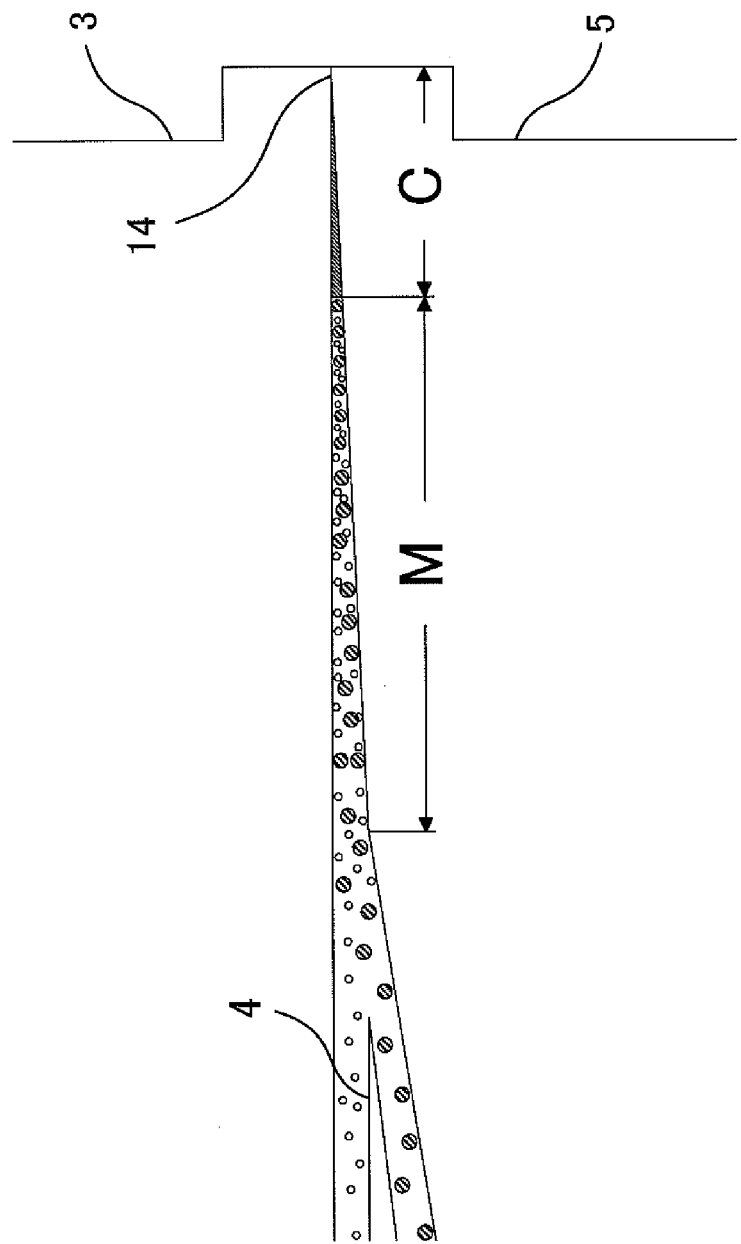
FIG. 13 illustrates a transient state achieved just after inflow of powder raw material particles and droplets starts.
Figure 14:
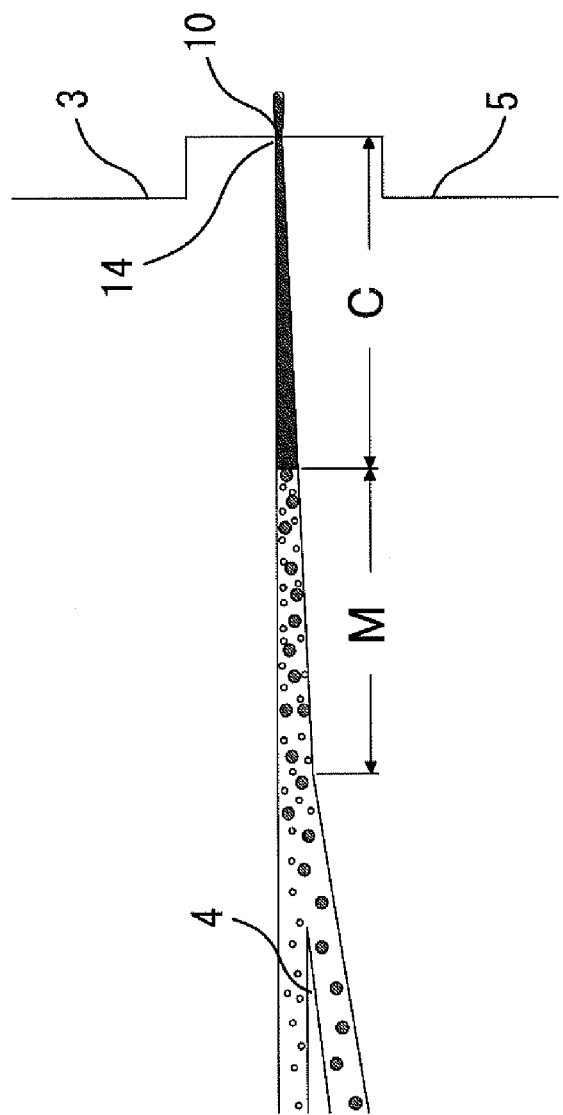
FIG. 14 illustrates a state achieved at a time when inflow and mixing of powder raw material particles and droplets are stabilized.
Figure 15:
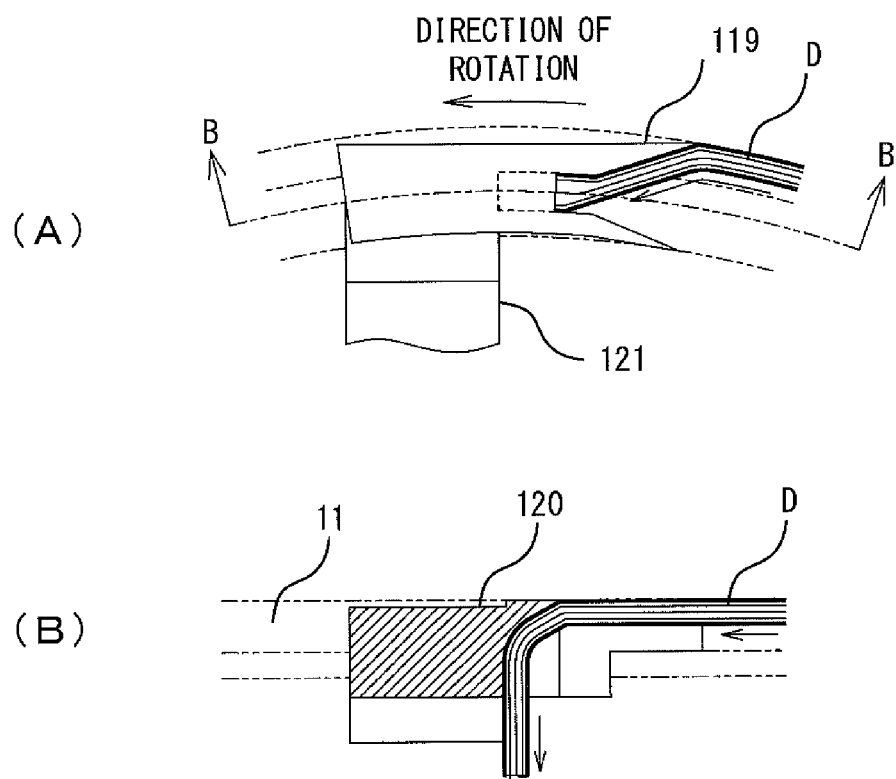
FIG. 15(A) is a plane view of a scraper 120.
FIG. 15(B) is a cross-sectional view taken on arcuate centerline B-B in FIG. 15(A).

FIG. 12 is an enlarged view of a cross section of the rotating disks 3, 4, and 5 depicted in FIG. 3. The particulate droplets that have left the sprayer head 7 fly within the flat space 36 sandwiched between the top surface of the rotating disk 4 and the under surface of the rotating disk 3. Air within the flat space 36 rotates at a rotational speed comparable to that of the rotating disks 3 and 4, and hence a generated centrifugal force generates a suction effect similar to a suction effect that would be generated by a centrifugal fan. However, a liquid reservoir 35 described above with reference to FIG. 11 has a sort of water sealing function, thereby eliminating the possibility of generation of an airflow from the space in which the powder raw material P is spread out to the flat space 36, and hence walls surrounding the spaces are kept to be clean.

The following will describe how a powder raw material and a liquid raw material are mixed. FIG. 12 depicts a situation in which a liquid raw material that has spread out on an inside surface of the rotating disk 3 in a thin film state changes into innumerable droplets and flies and flows into the space 9, a situation in which particles of a powder raw material that has spread out in the gap portion 8 flow into the space 9, and a situation in which these materials are mixed and released.

First, descriptions will be given of movement of the powder raw material from the gap portion 8 to the space 9. Air within the gap portion 8 is in contact with fast-rotating upper and lower walls and thus rotates at a high speed, thereby applying a force to powder-raw-material particles in a circumference direction. The powder-raw-material particles are accelerated in a radial direction simultaneously with starting to move in the circumference direction, spread out and float within the gap portion 8 while shaping dispersed particle swarms, and flow into the space 9 with a wedge-shaped cross section. The acceleration of the powder material within the gap portion 8 is weak because the one is through air, and hence the material flows into the space 9 at a speed that is far lower than the circumferential speed of the upper and lower walls.

Next, descriptions will be given of movement of a liquid raw material radiated from the sprayer head 7. The direction of an initial velocity of droplets is essentially a tangential direction of the sprayer head 7 forming a circumference, and the speed of the droplets is essentially equal to the circumferential speed of the sprayer head 7. Radiated droplets show an essentially-linear uniform motion in a horizontal plane and thus move at a very high speed in a radial direction at an inlet of the space 9, which is distant from the sprayer head 7.

An estimation of a space density of a dispersed particle swarm of the powder raw material P within the space 9 indicates a substantially high density due to a low flying speed of the particles. Consequently, droplets flying fast and flowing into the space 9 frequently collide with powder particles. The collision strongly agitates the dispersed particle swarm within the space 9 and eliminates unevenness in the space density of the dispersed particle swarm. Making the space density of the dispersed particle swarm equal results in a homogeneous mixture, thereby indicating that the agitation resulting from the collision is an important phenomenon.

FIGS. 13 and 14 depict phenomena seen in the space 9. FIG. 13 illustrates a transient state achieved just after inflow of powder raw material particles and droplets starts. In the situation in FIG. 13, the rotating disk 5 and the rotating disk 3 are still in contact with each other at the smallest gap portion 14. Thus, the dispersed particle swarm of the powder raw material P that has flown into the space 9 is blocked and accumulated in the smallest gap portion 14, thereby forming an accumulation layer. Particle swarms of the powder raw material P and liquid raw material L crash into an inner surface of the accumulation layer at different vectors one after another. A dispersed particle swarm of a low-speed high-density powder raw material softly falls onto the accumulation layer. A droplet swarm of the liquid raw material (droplet swarm that has not collided with powder particles) crashes into dispersed particles of the fallen powder raw material at a high speed, resulting in intense mixing, and condensation occurs in response to a high centrifugal acceleration. This forms a high-density condensation region C.

Development of the condensation region C leads to an increase in mass, which causes an increase in centrifugal force, and this enhances a wedge force applied to the rotating disk 5. The rotating disk 5 is pushed down when the wedge force exceeds an upward force caused by, for example, the elastic member 13. Consequently, accumulation in the smallest gap portion 14 is resolved, thereby generating flow of the mixture. The centrifugal force decreases due to a decrease in mass when the degree of opening of the smallest gap portion 14 increases and the amount of the mixture flowing out of the smallest gap portion 14 becomes larger than the amount of the mixture flowing into the smallest gap portion 14. This decreases a downward force.

The degree of opening of the smallest gap portion 14 is eventually stabilized in a state in which inflow and outflow are balanced. FIG. 14 illustrates a state achieved at a time when inflow and mixing of powder raw material particles and droplets are stabilized. FIG. 14 depicts a situation in which inflow and outflow of a mixture at the smallest gap portion 14 are balanced. In this case, an excessively large or excessively small condensation region C is undesirable. With an excessively small condensation region C, it is highly likely that the condensation region C will be partly lost at a portion of the space 9. Consequently, before the powder raw material and the liquid raw material are completely bonded, i.e., while both the powder raw material and the liquid raw material are still particles, these materials are radiated from the open end 10, i.e., an end located ahead of the smallest gap portion 14, and are readily scattered. This decreases the rate of adhesion of particles of the powder raw material and liquid raw material to the inner concave surface 12, thereby decreasing capture efficiency. By contrast, an excessively developed condensation region C leads to an excessively small mixing region M. This hinders the coexistence of dispersed particle swarms of the powder raw material and droplet swarms in the same space and thus inhibits homogeneous mixing.

The size of the condensation region C depends on various factors. In addition to forces generated by the elastic member 13 and the high-powered magnets 107 and 107', such factors include, for example, fluidity and adhesiveness of the mixture, the rotational speed and size of the rotating disks 3-5, and the weight of the rotating disk 5. The size of the condensation region C is optimally adjusted by increasing or decreasing changeable values from among such factors.

The mixture that has flown out of the open end 10 is initially shaped like a film but is strongly stretched out by a centrifugal force as soon as the mixture leaves the open end 10. Then, the mixture is released in a tangential direction of the periphery of the rotating disks 3 and 5 approximately at a circumferential speed while being disintegrated into particles. The particles of the mixture at that time are connected to each other by the liquid raw material, and the particle size thereof is far larger than that of the powder raw material particles. Hence, when particles of a mixture crash into the inner concave surface 12 of the toric member 11, the particles, in many cases, readily adhere to and are deposited on the inner concave surface 12.

In some cases, the mixture does not adhere to the inner concave surface 12. However, since the toric member 11 is rotating as will be described hereinafter, particles of the mixture are deposited on a vertical wall surface at the back of the inner concave surface 12 by a centrifugal force.

Referring to FIG. 4, the toric member 11 is rotatably supported by four sets of cam followers 118 and 119 provided on the same axis as the hollow shaft 102 and the rotation shaft 108. The toric member 11 is provided with gears along the shape thereof. During a mixing operation, the toric member 11 is rotated at a relatively low speed by the reduction-gear-equipped motor 115 and the gears 116 and 117, all depicted in FIG. 1.

Referring to FIG. 3, the scraper 120 is an apparatus fixed to the cover 122 with the support 121 provided at a position at which the mixture is extracted. FIGS. 15(A) and 15(B) depict details of the scraper 120. FIG. 15(A) is a plane view of the scraper 120. FIG. 15(B) is a cross-sectional view taken on arcuate centerline B-B in FIG. 15(A). "D" indicates a mixture deposited on the inner concave surface 12. The mixture rotates in the direction of an arrow together with the toric member 11, and is stripped off by a leading edge of the scraper 120. Mixture D" is deposited on and adheres over a long range to the inner concave surface 12, and hence a mixture that has been stripped off is subject to a force from the back that is equal to or greater than the frictional resistance of a slip surface of the scraper. Accordingly, the flow of the mixture along the scraper 120 is generated and maintained, and, after the flow is made to be directed downward, the flow is separated from the scraper with the help of the gravity and falls while assuming a shape of a string, e.g., flowing-down dough D' in FIG. 1. The mixture D' is continuously collected in a container (not illustrated) or on a conveyer (not illustrated), both provided at a position to which the flowing-down dough D' falls.

In fabricating products having a constant thickness such as noodles, a roller provided at a lower position may be used to provide a mixture D' having a constant thickness.

Main functions of this example have been described above. The following will simply supplementarily describe a method for assembling and disassembling the main components. Referring to FIG. 1, sleeves 125 are fixed to four corners of the under surface of an upper baseplate 124. Struts 127 are fixed to four corners of the top surface of a middle baseplate 123 to which the housing 110 is attached. Bushings 126 and 126' are press-fit in the sleeve 125. Hence, the upper baseplate 124 can be moved up and down by, for example, a jack (not illustrated) while maintaining a core with respect to the middle baseplate 123.

Accordingly, components supported by the housing 103, e.g., the stationary disk 2 and the rotating disks 3 and 4, can be lifted, if necessary, to positions higher than the positions of these components depicted in FIG. 1. Thus, the rotating disk 3 and the stationary disk 2 can be readily attached or detached. In the performing of the mixing operation, the upper baseplate 124 is returned to the position at the original height, and a nut 128 is tightened to firmly fix the upper baseplate 124, thereby preventing the upper baseplate 124 from being displaced during the operation.

<Application to Bread Making and Noodle Making>

The following will describe producing bread dough and noodle dough using the mixing apparatus in accordance with the invention.

First, descriptions will be given of the producing of dough for making bread. For water addition, a water solution may be prepared by adding, for example, wheat flour, yeast, salt, and sugar to a liquid raw material, as is usual.

A problem is that oil or fat, e.g., butter or shortening, needs to be added to many types of bread such as bread loaves, butter rolls, and French bread. The weight of the oil or fat may reach as high as 15 relative to the weight of wheat flour, 100. In the production method of the prior art, oil or fat is not initially put in a mixer but is put therein when hydration progresses to some extent so as to simultaneously complete hydration and mixing of the oil or fat.

There are three methods for adding oil or fat using the mixing apparatus in accordance with the invention. In a first method, a liquid raw material is inserted in a later process. Necessary oil or fat and dough in which hydration has been finished by the mixing apparatus of the invention are put in a vertical mixer having, for example, a mixing impeller, and the mixing impeller rotates at a low speed to mix them while suppressing damage to gluten organizations. The precision of the mixing required at that time does not need to be high in comparison with a required equality in hydration, and hence it is only necessary to lightly agitate the components without damaging the net-like organizations of gluten.

In a second adding method, emulsified oil or fat is added to a liquid raw material in advance. Fine particles of oil or fat are equally dispersed so that the oil or fat can be prevented from disturbing hydration.

In a third method, a liquid to which emulsified oil or fat is added is sent from a pipe provided together with the pipe 105. This enables the mixing ratio of oil or fat to be readily changed.

The second and third methods have the disadvantage that an emulsification apparatus is needed, but later processes that would be needed in the first method can be omitted from the second and third methods, thereby achieving a great advantage when any of these methods is applied to mass production.

In all of the methods above, ultimately obtained dough containing oil or fat achieves qualities that would not be achieved in the prior art. The reason is as follows. In the prior art, oil or fat is added while hydration has not been completed in some inner portions of dough, and, according to the circumstances, only oil or fat is bonded to wheat flour in some inner portions of dough, resulting in portions without gluten. By contrast, hydration occurs evenly within dough produced using the method of the present invention, and this generates far more minute gluten organizations than those in the prior art equally at all portions of the dough.

In addition, the method for making bread in accordance with the invention has an advantage that the prior art does not have. Such an advantage is that a mixing process can be completely separated from a kneading process for developing gluten net-like organizations. In regard to French bread, it is said to be preferable that net-like organizations are naturally generated initially in a fermentation stage, and hence kneading is not needed. When a method is used wherein emulsified oil or fat is added, dough can be completed using the mixing apparatus in accordance with the invention alone. This is also true for cake dough, i.e., a dough in which gluten organizations are preferably not excessively developed.

Hydration has already been completed within dough of what are called bread loaves and Brötchen, i.e., dough that needs to be kneaded, and hence simply lightly kneading the dough can develop gluten organizations, and, in addition, decreases the risk of damaging the organizations.

In short, the complete separation between the hydration process and the kneading process, which could not be achieved in the prior art, enables production of bread with taste and texture that could not be provided in the prior art.

Maintaining the dough at the right temperature allows fermentation by means of yeast to proceed. Gases generated during the fermentation are trapped in three-dimensional net-like organizations of gluten that are more minute than those in the prior art, thereby evenly generating fine bubbles. Accordingly, baked bread will have fine crumb (inner portion of bread) with sufficient elasticity, and a crispy thin crust, without the addition of a problematic additive.

The following will describe noodle making. In industrial production of udon, first, noodles having a specific cross-sectional shape and size are roll-formed using a cutting roller. In this case, a problem often seen is that dough adheres to the cutting roller. Such a problem tends to occur when water is not spread evenly within the dough. This is because viscosity is generated at a portion with excess water within the dough.

In the prior art, it is difficult to make water completely even, and hence water content (=weight of added water relative to wheat flour, 100) unavoidably needs to be kept low, e.g., 40% or lower. Due to the low water content maintained, it is more difficult to spread water evenly throughout within wheat flour than to make bread dough. Agitating the dough to trigger hydration throughout therewithin would damage gluten net-like organizations, and hence the agitation needs to be terminated while water is unevenly spread. Consequently, time-consuming and troublesome processes, e.g., aging, remixing, and enlarging, need to be added.

By contrast, in the fabricating method in accordance with the invention, water spreads evenly throughout within the dough, and viscosity is not readily generated at any portion, so that the water content can be increased to 50% or higher. Unlike in the prior method, in which protein, i.e., a raw material for gluten, is lost due to unintended gluten generation destruction in a mixing process, all protein is just hydrated. Hence, moderate kneading efficiently develops gluten net-like organizations, leading to sufficiently elastic dough equivalent to dough with a water content of 40%.

That is, in the method for fabricating dough using the mixing apparatus of the invention, dough with the same adhesiveness and viscosity as in the prior art is obtained even when the water content increases by 10% or more compared with dough in the prior method.

Water content is actually an important index that influences a boiling time. In the prior fabricating method, the core even of noodles for which kneading has just been performed does not contain sufficient water for gelatinization (about 60% of the amount of starch), and hence it takes a long time for water to penetrate the core during boiling. In the case of dried noodles, a low water content results in hard and fine noodles, and hence it also takes a long time to boil such noodles.

In the case of noodles for which kneading has just been performed, since such noodles essentially contain sufficient water, achieving a water content of 50% or higher using the method for fabricating dough using the mixing apparatus of the invention decreases the time before water penetrates the core, and thus shortens the boiling time. In regard to dried noodles, water readily penetrates takasui-men (a type of noodle with a high water content), and this causes gelatinization in a short time and thus shortens the boiling time again. Shortening the boiling time may decrease the amount of elution of the inherent flavor and fragrance of noodles into boiling water. The outer layer of noodles is seldom excessively boiled and damaged. There are many advantages, including the saving of thermal energy for boiling.

In fabricating somen using the conventional method, hydration is completed in a way that takes time and effort, e.g., a hand-pulling technique, and gluten organizations are sufficiently developed in a longitudinal direction so as to achieve a good feeling of noodles traveling down the throat. By contrast, producing dough evenly hydrated using the dough fabricating method based on the mixing apparatus of the invention may allow stable gluten organizations to be made as in the case of udon described above, and may considerably decrease the time required to produce dough. Accordingly, oil for prevention of drying does not need to be applied in a noodle making process, and long-term storage, i.e., a conventionally performed process for removing oil, becomes unnecessary.

What is called pasta that contains durum semolina wheat as a main raw material, e.g., spaghetti and macaroni, has conventionally been made mostly using a noodle extrusion method based on a die. The purpose is to promote hydration by removing air, which has a property of disturbing moisture penetration. This, however, will inevitably lead to fine noodles and will thus delay moisture penetration during boiling, resulting in a long boiling time for the thickness of the noodles. Since air is not contained in the noodles, the taste buds are not intermittently stimulated, thereby spoiling the taste, i.e., an important factor.

In the method for fabricating dough using the mixing apparatus of the invention, hydration occurs evenly throughout so that gluten net-like organizations can be readily obtained, and hence noodles can be fabricated using a method similar to the method for making udon. Accordingly, the taste buds are intermittently stimulated, and, in addition, a high water content can be achieved as described above, thereby decreasing the boiling time, with the result that the taste is improved. As in the case of udon, many other advantages are also achieved.

As described above, the mixing apparatus in accordance with the invention equally spreads out a supplied powder raw material, equally atomizes a liquid raw material, and conducts the equally spread powder raw material and the equally atomized liquid raw material into an identical narrow space where these materials are merged and mixed. Then, a condensed high-density mixture is formed and released by a centrifugal force. The released mixture is deposited on the vertical wall surface of the inner concave surface 12 of the toric member 11. The mixture deposited on the vertical wall surface of the inner concave surface 12 is collected using the scraper 120 so that a homogeneous mixture of the powder raw material and liquid raw material can be continuously obtained.

A specific method for achieving the features above will be described in the following. First, the powder raw material P passes through a small gap between the fast-rotating disk 1 and the stationary disk 2, i.e., a stationary disk provided for the rotating disks 1 and 5, and a small gap between the fast-rotating disk 5 and the stationary disk 2, and is spread out equally in all directions as a result of the two leveling effects. For the liquid raw material L, droplet swarms can be spread out equally in all directions using a rotatory atomizing scheme arranged to cause the liquid raw material L to flow equally in all directions.

The rotating disk 5 is supported by the elastic member 13, i.e., a member having elasticity in a vertical direction relative to the rotating disk 1, in such a manner as to stably form a mixing region and a condensation region within the wedge-shaped space 9. Particulate droplet swarms are made to crash at a high speed into dispersed particulate swarms of the powder raw material P floating within the mixing region M and the powder raw material P lying thick on the surface of the condensation region C. This strongly agitates the dispersed particulate swarms within the mixing region and maintains the mixing and bonding on the inner surface of the condensation region in an optimal state.

Mixture particles released from the open end 10 via the smallest gap portion 14 are deposited on the inner concave surface 12 of the toric member 11 and are collected using the scraper 120. This allows the mixture D to be continuously obtained efficiently.

In addition, providing the curved inside surface 16 and the space 17 for the stationary disk 2 may reduce a minute variation in supply of the powder raw material.

Providing the aggregate crusher plate 18 at a lower portion of the space 17 enables disintegration of an aggregate that has passed through the gap portion 6.

Supplying a powder raw material containing wheat flour and a liquid raw material containing water to the mixing apparatus in accordance with the invention allows a high-quality food containing wheat flour as a main material to be fabricated with a reduced and simplified facility.

In using the mixing apparatus in accordance with the invention so as to make a food containing wheat flour as a main material and having an oil or fat raw material added thereto, the oil or fat raw material is emulsified and put in water in advance. This allows a high-quality food to be fabricated at low cost.

Using the mixing apparatus in a bread making process allows a hydration process and a kneading process to be completely separated, thereby enabling production of bread having a texture that could not be achieved in the prior art.

Using the mixing apparatus in a bread making process allows bread having minute gluten organizations to be readily made, thereby making the use of problematic additives such as potassium bromate unnecessary.

The mixing apparatus is of high utility value in mixing medicines or industrial raw materials for which the use of agitation mixing or long-term processes is unsuitable.

As described above, supplying a powder raw material and a liquid raw material to the mixing apparatus of the invention at a constant rate enables the powder raw material and the liquid raw material to be evenly mixed, and allows a mixture of the powder raw material and the liquid raw material to be continuously extracted at a constant rate. Only a small amount of material remains in the mixing apparatus when a mixing operation ends, thereby suppressing waste of material. Moreover, it is easy to clean the apparatus. Even though the apparatus is small-sized, consecutive processing may advantageously lead to high efficiency and thus achieve a low equipment cost.

The invention is not limited to the embodiments described above, and may use various configurations or embodiments without departing from the gist of thereof.

EXPLANATION OF THE CODES

1 Rotating disk
1' Rotating disk
2 Rotating disk
3 Rotating disk
4 Rotating disk
5 Rotating disk
6 Gap portion
7 Sprayer head
8 Gap portion
9 Space
10 Open end
11 Toric member
12 Inner concave surface
13 Elastic member
14 Smallest gap portion
16 Curved inside surface
17 Space
18 Aggregate crusher plate
19 Vertical wall
20 Gap part
21 Guide
22 Horizontal member
23 Liquid reservoir
24 Hole
25 Slope
26 Groove
27 Minute gap
28 Vertical wall
29 Groove
29a Puddle
30 Vertical wall
31 Ceiling
32 Ceiling
33 Groove
34 Parting strip
34a Hole
35 Liquid reservoir
36 Flat space
40 Groove
101 Funnel
102 Hollow shaft
103 Housing
104 Bearing
104' Bearing
105 Pipe
106 Flow channel hole
107 Small magnet
107' Small magnet
108 Rotation shaft
110 Housing
111 Motor
112 Large pulley
113 Belt
114 Small pulley
115 Reduction-gear-equipped motor
116 Gear
117 Gear
118 Cam follower
119 Cam follower
120 Scraper
121 Support
122 Cover
123 Middle baseplate
124 Upper baseplate
125 Sleeve
126 Bushing
126' Bushing
127 Strut
128 Nut

What is claimed is:
1. A mixing apparatus comprising:
a first disk configured to rotate on a vertical axis and to radiate a powder raw material supplied from a vertical axis direction in an outer edge direction;
a second disk, the second disk being a stationary disk separated from a top surface of the first disk by a predetermined distance and provided in a manner such that the powder raw material radiated on the first disk is leveled in passing through a first gap formed by separating the second disk by the predetermined distance;
a third disk configured to cover the second disk and to rotate on a same axis as the first disk, the third disk including an atomizing head that atomizes and radiates in an outer edge direction a liquid raw material supplied while the third disk is rotating;
a fourth disk having a shorter diameter than a diameter of the third disk, fixed to the third disk, and separated from an under surface of the third disk by a predetermined distance, the fourth disk being configured to rotate on a same axis as, and in an integrated manner with, the third disk, the fourth disk including, at an outermost portion, a horizontal top surface and an under surface inclined upward toward an outer edge, the fourth disk being provided in a manner such that the atomized liquid material passes through a second gap formed between the top surface of the fourth disk and the under surface of the third disk; and
a fifth disk provided below the fourth disk and separated from the under surface of the fourth disk by a predetermined distance, the fifth disk being configured to rotate on a same axis as, and in an integrated manner with, the first disk, and having a diameter that is longer than a diameter of the fourth disk, the fifth disk being provided in a manner such that the powder raw material leveled by the second disk passes through a third gap formed between a top surface of the fifth disk and the under surface of the fourth disk, wherein
the under surface on an outer edge side of the third disk and the top surface on an outer edge side of the fifth disk face and fit each other in such a manner as to sandwich the fourth disk from a top surface direction and under surface direction of the fourth disk,
in a fourth gap formed between the outer edge of the fourth disk, the under surface on the outer edge side of the third disk, and the top surface on the outer edge side of the fifth disk, a mixture of the liquid raw material radiated from the second gap and the powder raw material radiated from the third gap is deposited on a portion where the third disk and the fifth disk face and fit each other, and in accordance with an amount of the deposited mixture and a centrifugal force applied to the mixture, the third disk is pushed up, or the fifth disk is pushed down, to radiate the mixture in circumference directions of the third and fifth disks.

2. The mixing apparatus according to claim 1, further comprising:
   a toric member shaped like a torus having an inside diameter in which the third and fifth disks are located, the toric member being configured to deposit the mixture radiated from the outer edges of the third and fifth disks on a side face of the inside diameter; and
   a collecting unit configured to strip off the mixture deposited on the side face of the inside diameter of the toric member.

3. The mixing apparatus according to claim 1, wherein a portion of the fifth disk below the first gap is supported by an elastic member having elasticity in a vertical direction, and magnets are implanted in the third and fifth disks such that the third and fifth disks face and fit each other.

4. A method for mixing a powder material and a liquid material using a mixing apparatus, wherein the mixing apparatus includes:
   a first disk that rotates on a vertical axis and that radiates a powder raw material supplied from a vertical axis direction in an outer edge direction;
   a second disk, the second disk being a stationary disk separated from a top surface of the first disk by a predetermined distance;
   a third disk that covers the second disk and that rotates on a same axis as the first disk, the third disk including an atomizing head that atomizes and radiates in an outer edge direction a liquid raw material supplied while the third disk is rotating;
   a fourth disk having a shorter diameter than a diameter of the third disk, fixed to the third disk, and separated from an under surface of the third disk by a predetermined distance, the fourth disk rotating on a same axis as, and in an integrated manner with, the third disk, the fourth disk including, at an outermost portion, a horizontal top surface and an under surface inclined upward toward an outer edge; and
   a fifth disk provided below the fourth disk and separated from the under surface of the fourth disk by a predetermined distance, the fifth disk rotating on a same axis as, and in an integrated manner with, the first disk, and having a diameter that is longer than a diameter of the fourth disk, and the method comprises:
leveling the powder raw material radiated on the first disk by causing the powder raw material to pass through a first gap formed between the first and second disks;
causing the atomized liquid material to pass through a second gap formed between the top surface of the fourth disk and the under surface of the third disk;
causing the powder material leveled by the second disk to pass through a third gap formed between the top surface of the fifth disk and the under surface of the fourth disk;
in a fourth gap, bonding the liquid raw material radiated from the second gap to the powder raw material radiated from the third gap, the fourth gap being formed between the outer edge of the fourth disk, the under surface on the outer edge side of the third disk, and the top surface on the outer edge side of the fifth disk in a condition in which the under surface on the outer edge side of the third disk and the top surface on the outer edge side of the fifth disk face and fit each other in such a manner as to sandwich the fourth disk from the top surface direction and under surface direction of the fourth disk; and
depositing a mixture of the bonded liquid raw material and powder raw material on a portion where the third disk and the fifth disk face and fit each other, and radiating the mixture in circumference directions of the third and fifth disks by pushing up the third disk or pushing down the fifth disk in accordance with an amount of the deposited mixture and a centrifugal force applied to the mixture.

* * * * *